(12) United States Patent
Hua et al.

(10) Patent No.: US 12,418,219 B2
(45) Date of Patent: Sep. 16, 2025

(54) STATOR STRUCTURE WITH HEAT DISSIPATION MODULE HAVING SMOOTH ARC CURVED SURFACE AND CONDITION BRIDGE IN GAP IN HEAT DISSIPATION MODULE

(71) Applicant: SOUTHEAST UNIVERSITY, Nanjing (CN)

(72) Inventors: Wei Hua, Nanjing (CN); Zhiheng Zhang, Nanjing (CN); Wenfei Yu, Nanjing (CN); Peixin Wang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/921,006

(22) PCT Filed: Jun. 30, 2022

(86) PCT No.: PCT/CN2022/102725
§ 371 (c)(1),
(2) Date: Oct. 24, 2022

(87) PCT Pub. No.: WO2023/087728
PCT Pub. Date: May 25, 2023

(65) Prior Publication Data
US 2024/0223046 A1    Jul. 4, 2024

(30) Foreign Application Priority Data

Nov. 18, 2021   (CN) .......................... 202111371356.2

(51) Int. Cl.
*H02K 9/00* (2006.01)
*H02K 1/20* (2006.01)
(Continued)

(52) U.S. Cl.
CPC ................. *H02K 9/22* (2013.01); *H02K 1/20* (2013.01); *H02K 5/04* (2013.01); *H02N 15/00* (2013.01)

(58) Field of Classification Search
CPC ............ H02K 3/522; H02K 3/24; H02K 9/22; H02K 9/005; H02K 9/02; H02K 9/04;
(Continued)

(56) References Cited

U.S. PATENT DOCUMENTS 2,074,067 A * 3/1937 Darnell .................... H02K 9/06
310/52
3,610,975 A * 10/1971 Onjanow ................. H02K 9/18
416/93 R
(Continued)

FOREIGN PATENT DOCUMENTS

CN    102157993 A    8/2011
CN    108270301 A    7/2018
(Continued)

OTHER PUBLICATIONS

Tingting Zhu et al., Research on Hybrid-excited Flux-switching Machine and the Current Vector Control Strategy, May 25, 2012, pp. 140-147, vol. 32, issue 15, Proceedings of the CSEE.
(Continued)

*Primary Examiner* — Maged M Almawri
(74) *Attorney, Agent, or Firm* — Muncy, Geissler, Olds & Lowe, P.C.

(57) ABSTRACT

A stator structure of a magnetic levitation flux-switching motor includes a stator of a modular structure and a motor housing. A modular stator includes front and rear side winding end heat dissipation modules, modular stator left and right wings, a modular stator permanent magnet, front side magnetic conduction column left and right wings, an inter-front side and inter-rear side magnetic conduction
(Continued)

column permanent magnets, insulating layers, a stator winding, and rear side magnetic conduction column right and left wings. The front side and rear side winding end heat dissipation modules are of hollow structures, and are symmetrically provided with a cooling medium inlet and a cooling medium outlet, a cooling medium channel is disposed inside a hollow cavity, one side of the heat dissipation module is a smooth curved surface, and good thermal contact can be achieved between the heat dissipation module and the stator winding and the insulating layer.

5 Claims, 15 Drawing Sheets

(51) Int. Cl.
  *H02K 5/04* (2006.01)
  *H02K 9/22* (2006.01)
  *H02N 15/00* (2006.01)
(58) Field of Classification Search
  CPC .. H02K 9/06; H02K 9/08; H02K 9/10; H02K 9/12; H02K 9/14; H02K 9/16; H02K 9/18; H02K 9/19; H02K 5/20; H02K 5/04; H02N 15/00
  USPC ...... 310/52, 58, 57, 59, 60, 89, 63, 62, 194, 310/54, 214, 43, 65, 60 A
  See application file for complete search history.

(56) References Cited

U.S. PATENT DOCUMENTS

| | | | | |
|---|---|---|---|---|
| 3,761,748 | A * | 9/1973 | Baumann | H02K 9/06 310/58 |
| 4,492,885 | A * | 1/1985 | Kitamura | H02K 9/06 310/63 |
| 5,258,679 | A * | 11/1993 | Gassmann | H02K 11/33 310/194 |
| 6,066,905 | A * | 5/2000 | Wright | H02K 3/20 310/260 |
| 6,188,153 | B1 * | 2/2001 | Hokanson | H02K 9/00 310/58 |
| 6,570,284 | B1 * | 5/2003 | Agnes | H02K 1/185 310/156.01 |
| 6,658,721 | B2 * | 12/2003 | Kazama | H02K 15/02 310/216.008 |
| 6,700,235 | B1 * | 3/2004 | McAfee | H02K 9/06 310/58 |
| 6,784,586 | B2 * | 8/2004 | Akemakou | H02K 21/042 310/194 |
| 7,538,467 | B2 * | 5/2009 | Engquist | H02K 1/24 310/216.067 |
| 8,013,490 | B2 * | 9/2011 | Hino | H02K 3/522 310/194 |
| 8,179,015 | B2 * | 5/2012 | Nishikawa | H02K 21/044 310/263 |
| 8,203,240 | B2 * | 6/2012 | Hoshino | B60L 50/16 310/214 |
| 8,253,299 | B1 * | 8/2012 | Rittenhouse | B62M 6/90 310/257 |
| 11,646,610 | B2 * | 5/2023 | Kim | H02K 3/04 310/179 |
| 2002/0149273 | A1 * | 10/2002 | Soitu | H02K 5/203 310/58 |
| 2004/0155550 | A1 * | 8/2004 | Yamamoto | H02K 13/04 310/194 |
| 2004/0222715 | A1 * | 11/2004 | Yamamura | H02K 15/095 310/216.015 |
| 2009/0184591 | A1 * | 7/2009 | Hoshino | B60L 3/0061 310/60 A |
| 2013/0154397 | A1 * | 6/2013 | Sullivan | H02K 21/22 310/68 B |
| 2013/0221770 | A1 * | 8/2013 | Yokogawa | H02K 3/345 310/43 |
| 2015/0028727 | A1 * | 1/2015 | Watanabe | H02K 1/2706 310/60 A |
| 2016/0043604 | A1 * | 2/2016 | Yoshida | H02K 3/325 310/71 |
| 2022/0109358 | A1 * | 4/2022 | Tamura | H02P 21/0003 |

FOREIGN PATENT DOCUMENTS

| | | |
|---|---|---|
| CN | 112510878 A | 3/2021 |
| CN | 113285558 A | 8/2021 |
| CN | 113323963 A | 8/2021 |
| CN | 114157097 A | 3/2022 |

OTHER PUBLICATIONS

Chenyin Zhao et al., Design and Analysis of a Novel Bearingless Flux-Switching Permanent Magnet Motor, Mar. 14, 2017, pp. 6127-6136, vol. 64, issue 8, IEEE Transactions on Industrial Electronics.

* cited by examiner

STATOR STRUCTURE WITH HEAT DISSIPATION MODULE HAVING SMOOTH ARC CURVED SURFACE AND CONDITION BRIDGE IN GAP IN HEAT DISSIPATION MODULE

TECHNICAL FIELD

The present disclosure relates to the electrical and mechanical transmission technology, specifically discloses a stator structure of a magnetic levitation flux-switching motor, and belongs to the technical field of power generation, power transformation or power distribution.

BACKGROUND

At this stage, flux-switching motors have been very widely researched and applied in the fields of industrial drives, cordless lift traction, tidal and wind power generation and the like because of their high power density, high efficiency, high reliability, good cooling conditions of permanent magnets, and the like. In recent years, with the development of the high-speed motor technology, high-speed motor product types are gradually enriched. Flux-switching motors with magnetic levitation bearings can largely improve or overcome the problems including loss, heat dissipation and stress faced by traditional rotor permanent magnet type motors, showing huge structural advantages and application potential.

Technological innovation and product development have been carried out at home and abroad about bearingless flux-switching motors, magnetic levitation bearing flux-switching motors and the like. For the bearingless flux-switching motor, Design and Analysis of a Novel Bearingless Flux-Switching Permanent Magnet Motor (6127-6136) was published in the international journal SCI, *IEEE Transactions on Industrial Electronics* in August 2017, which designed a bearingless flux-switching motor that can achieve bearingless levitation rotation by arranging a torque winding and a levitation force winding in a motor stator slot. However, with the two sets of windings arranged in the same slot in this solution, the torque output capability is bound to be reduced, and there is also a very serious problem of electromagnetic and temperature field coupling between the two sets of windings, with low reliability. For the magnetic levitation bearing flux-switching motor, the Chinese invention patent publication No. CN113323963A discloses a stator permanent magnet motor magnetic bearing with a magnetic pole bypass and a bias force adjustment method of the stator permanent magnet motor magnetic bearing, and designs the magnetic pole bypass containing a permanent magnet extending out of a stator section, a radial magnetic conduction bridge, a circumferential magnetic conduction bridge, a magnetic gathering shoe and the like to achieve multi-path controlled distribution of the magnetic field strength of the permanent magnet magnetic field energy in stator permanent magnet type motors. The bias force adjustment structure in a bias magnetic circuit is designed to make use of the motor winding end space to the maximum extent, which reduces the axial length of the magnetic levitation bearing motor system. The Chinese invention patent publication No. CN113285558A discloses a force-balanced type stator permanent magnet motor magnetic bearing with an adjustable bias magnetic field, the electromagnetic pole is regulated by the current passed into the coil of the electromagnetic pole winding, the common path of the permanent magnet bias flux and the electromagnetic pole flux is only the magnetic bearing rotor, and adjusting the magnetic conductivity of the axial magnetic bearing flux-regulating member as well as the volume of the embedded magnetic conduction section, and changing the relative distance between the thrust disc and the front side permanent magnet pole as well as between the thrust disc and the rear side permanent magnet pole facilitate the control of the magnetic bearing, which achieves the purposes of a compact structure and the adjustable bias magnetic field. Both of these technical solutions can achieve the goal of a highly compact and integrated "magnetic levitation bearing+permanent magnet motor system", which is an important attempt to integrate magnetic levitation bearings and flux-switching motors.

On the other hand, the design of reliable thermal management and efficient heat dissipation solutions of the motor stator has been a hot topic of research for those skilled in the art. Reports in the prior art include many practical heat dissipation technologies of stator cooling loops, oil injection cooling, refrigerant or heat pipe cooling and the like. However, the heat dissipation technology of the stator cooling loop is usually unable to cool the stator winding ends, which can result in high temperature zones at the winding ends. The heat dissipation technology of oil injection cooling requires complex design of oil injection nozzles and circulation loops. The heat dissipation technology of refrigerant or heat pipe cooling is more common in refrigerant compressor motors. The refrigerant needs a special recovery and circulation device, and the cold end and the hot end need scientific design and arrangement when heat pipes are used. The cooling effect is related to the spatial placement of the motor and gravity distribution, and in addition, the space occupied by the cold end is larger.

In order to improve the heat dissipation of the stator winding end, two main approaches are in the prior art. The first approach is a forced air cooling approach that brings the cold air into contact with all the heat generating parts of the generator as much as possible, and this approach requires a complex fan structure and air path design. The second approach is to form radial ventilation holes, cavities and channels in the stator, which means that the structure of the motor stator iron core is bound to be damaged, affecting the electromagnetic performance of the motor; and the cooling method is conventional forced air cooling or liquid cooling in the pipeline, the motor processing cost and the complexity further increase, and the unreliability of the structure increases, which is not conducive to the actual industrialization.

In summary, the design of a stator structure of a highly integrated and efficient heat dissipation type magnetic levitation flux-switching motor to enhance the integration level of magnetic levitation bearings and flux-switching motors, improve the stator heat dissipation capability, and provide valuable reference for the highly integrated and efficient heat dissipation design of other types of motors has important theoretical and practical significance for the industrial application of magnetic levitation flux-switching motors.

SUMMARY

Directing at the above-mentioned deficiencies in the background, the object of the present disclosure is to provide a stator structure of a magnetic levitation flux-switching motor, achieve the purpose of improving the integration degree between a magnetic levitation bearing and a flux-switching motor while improving the heat dissipation capacity at ends of stator windings, enable the motor to have a higher power/torque density, and solve the technical problem that increasing the heat dissipation design of a heat dissipation structure at the end of the stator winding is not conducive to the modular design of a magnetic levitation flux-switching motor stator and changing the heat dissipation design at the end of the stator winding of the structure of the stator itself affects the electromagnetic performance of the magnetic levitation flux-switching motor.

In order to implement the above disclosure objectives, the present disclosure adopts the technical solution as follows:

A stator structure of a highly integrated and efficient heat dissipation type magnetic levitation flux-switching motor includes a motor housing and a stator, the motor housing thermally sleeving the outer side of the stator; a cooling water channel being disposed in the motor housing; the stator being of a modular structure, and a modular stator including a front side winding end heat dissipation module, a rear side winding end heat dissipation module, a modular stator left wing, a modular stator permanent magnet, a modular stator right wing, insulating layers and a stator winding; the modular stator left wing, the modular stator permanent magnet and the modular stator right wing constituting a modular iron core structure; an axial front side of the front side winding end heat dissipation module being in close contact with an arc segment at one end of the stator winding, an axial rear side of the front side winding end heat dissipation module being in close contact with an axial front side of a modular stator iron core, an axial front side of the rear side winding end heat dissipation module being in close contact with the modular stator iron core, an axial rear side of the rear side winding end heat dissipation module being in close contact with an arc segment at the other end of the stator winding, the front side winding end heat dissipation module and the rear side winding end heat dissipation module being of hollow structures and provided with a cooling medium inlet and a cooling medium outlet, and a cooling medium channel being disposed inside a hollow cavity; and stator teeth being formed after the front side winding end heat dissipation module and the rear side winding end heat dissipation module are in close contact with the modular stator iron core, the stator winding being wound on the stator teeth, an insulating layer being disposed between one end of the stator winding and the axial front side of the front side winding end heat dissipation module, and an insulating layer being disposed between the other end of the stator winding and the axial rear side of the rear side winding end heat dissipation module.

Preferably, the modular stator further includes: a radial magnetic conduction bridge of a front side magnetic pole bypass composed of a front side magnetic conduction column left wing, an inter-front side magnetic conduction column permanent magnet and a front side magnetic conduction column right wing, and a radial magnetic conduction bridge of a rear side magnetic pole bypass composed of a rear side magnetic conduction column right wing, an inter-rear side magnetic conduction column permanent magnet and a rear side magnetic conduction column left wing, and at this time, a slot for the radial magnetic conduction bridge of the front side magnetic pole bypass to be embedded in is reserved in the axial rear side of the front side winding end heat dissipation module, and a slot for the magnetic conduction bridge of the rear side magnetic pole bypass to be embedded in is reserved in the axial front side of the rear side winding end heat dissipation module.

Preferably, when the modular stator is used for a bearingless flux-switching motor with a torque winding and a levitation force winding, the lengths of the front side winding end heat dissipation module and the rear side winding end heat dissipation module are determined according to the number of turns of the two sets of stator windings, the motor size, the winding hardness, the bending radius and the heat dissipation requirement, the two sets of windings are both closely wound on the stator teeth, an insulating layer is disposed between the axial front side of the front side winding end heat dissipation module and each set of stator winding, and an insulating layer is disposed between the axial rear side of the rear side winding end heat dissipation module and each set of stator winding.

Preferably, the modular stator permanent magnet and the inter-front side magnetic conduction column permanent magnet, and the inter-rear side magnetic conduction column permanent magnet are one piece of integrated permanent magnet, improving the integrity and integration degree, and the number of segments can also be properly set in the axial direction according to needs so as to facilitate processing and reduce the eddy current loss.

Preferably, the modular stator left wing and the modular stator right wing are in an "L" shape, and located on both sides of the modular stator permanent magnet, forming a stable "sandwich" structure, and facilitating the winding operation.

Preferably, the modular stator left wing has a "groove" on one side and the modular stator right wing has a "protrusion" on one side, and when all the modular stators form the complete stator along the circumference, the "protrusion" is embedded into the "groove", which can improve the integrity and stability of the stator.

Preferably, the radial magnetic conduction bridge in the rear side magnetic pole bypass and the radial magnetic conduction bridge in the front side magnetic pole bypass are consistent in structure.

Preferably, one side of the front side magnetic pole bypass and one side of the rear side magnetic pole bypass are in close contact with one side of the modular iron core structure, and the other sides of the front side magnetic pole bypass and the rear side magnetic pole bypass are respectively in contact with the front side winding end heat dissipation module and the rear side winding end heat dissipation module after being embedded into the reserved slots of the front side winding end heat dissipation module and the rear side winding end heat dissipation module.

Preferably, the stator winding is a centralized winding, and an insulating layer is disposed between the stator winding and the modular stator.

Preferably, the axial rear side of the front side winding end heat dissipation module and the axial front side of the rear side winding end heat dissipation module are flat, the axial front side of the front side winding end heat dissipation module and the axial rear side of the rear side winding end heat dissipation module are smooth arc curved surfaces, the diameter and the arc length of the smooth arc curved surface can be optimally designed according to requirements, and preferably, a smooth arc curved surface line is an ellipse, the major axis of the ellipse is equal to the tooth width of the stator, and the minor axis of the ellipse is optimally designed according to requirements.

Preferably, the front side winding end heat dissipation module and the rear side winding end heat dissipation module can also be made into a solid structure without a cooling medium channel, but still retain the smooth arc curved surface in contact with the end of the winding and the flat surface in contact with the modular stator iron core.

The technical solutions of the present disclosure have the following beneficial effects:

(1) The present application proposes a stator structure integrated with winding end heat dissipation modules, the end heat dissipation module has a smooth arc curved surface in close contact with the end of the winding and the plane in close contact with a stator iron core, and a cooling loop is disposed inside the winding end heat dissipation module, the centralized winding can be closely wound on the modular stator iron core to ensure good thermal contact, the magnetic levitation flux-switching motor using this stator structure is convenient to process and assemble, and at the same time can ensure a high stator slot full rate, without designing a complicated forced air cooling loop and without destroying the original stator structure, which improves the integration degree between a magnetic levitation bearing and a flux-switching motor and the heat dissipation capacity at the end of the stator winding.

(2) When the present disclosure is applied to the magnetic levitation flux-switching motor including the radial magnetic conduction bridge of front and rear magnetic conduction loops, the slot in close contact with the radial magnetic conduction bridge is reserved at the end module of the winding, and the inter-column permanent magnet and the modular stator permanent magnet are of an integrated structure, further improving the integration degree of such a magnetic levitation flux-switching motor.

(3) The stator structure proposed in the present disclosure can also be implemented in a bearingless flux-switching motor, and has the advantages of high integration and efficient heat dissipation, improves the torque output capability and levitation force while improving the heat dissipation performance at the end of the stator winding, and provides strong technical support for the industrial application of high-speed and high-power density magnetic levitation flux-switching motors.

Figure 1:
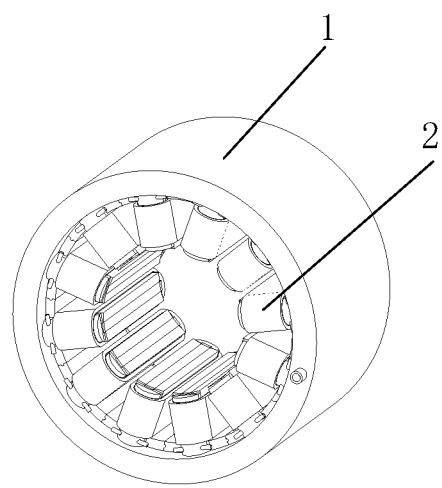
FIG. 1 is a structural view of a stator (including a motor housing) of a highly integrated and efficient heat dissipation type magnetic levitation flux-switching motor provided by Embodiment 1 of the present disclosure.

Reference numerals: 1. Motor housing; 2. Stator; 3. Front side winding end heat dissipation module; 4. Rear side winding end heat dissipation module; 201. Modular stator left wing; 202. Modular stator permanent magnet; 203. Modular stator right wing; 204. Front side magnetic conduction column left wing; 205. Inter-front side magnetic conduction column permanent magnet; 206. Front side magnetic conduction column right wing; 207. Insulating layer; 208. Stator winding; 209. Rear side magnetic conduction column right wing; 2010. Inter-rear side magnetic conduction column permanent magnet; 2011. Rear side magnetic conduction column left wing; S1. Groove; S2. Protrusion; 301. Front side winding end heat dissipation module cooling medium outlet; 302. Front side winding end heat dissipation module cooling medium inlet; 5. Cooling medium flowing direction; 6. Torque winding; 7. Levitation force winding; 8. Torque winding insulating layer; and 9. Levitation force winding insulating layer.

DETAILED DESCRIPTION

The technical solutions of the present disclosure are described below with reference to the accompanying drawings.

Figure 2:
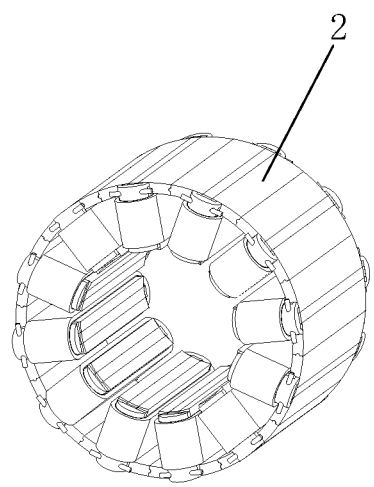
FIG. 2 is a structural view of a stator (with a motor housing hidden) of a highly integrated and efficient heat dissipation type magnetic levitation flux-switching motor provided by Embodiment 1 of the present disclosure.
Figure 3:
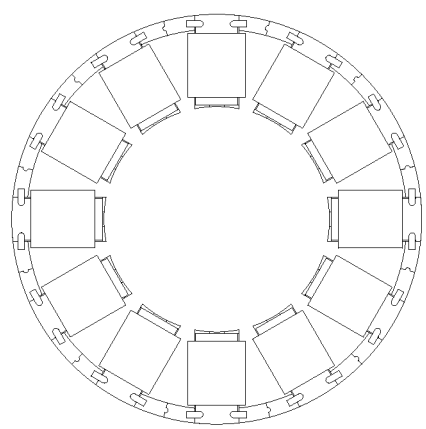
FIG. 3 is an axial front view of a stator structure (with a motor housing hidden) of a highly integrated and efficient heat dissipation type magnetic levitation flux-switching motor provided by Embodiment 1 of the present disclosure.

Embodiment 1: A Stator Structure of a Magnetic
Levitation Flux-Switching Motor Integrated with
Winding End Heat Dissipation Modules and Radial
Magnetic Conduction Bridges As shown in FIG. 1, FIG. 2 and FIG. 3, this embodiment provides a stator structure of a highly integrated and efficient heat dissipation type magnetic levitation flux-switching motor, including a motor housing 1 and a stator 2. The motor housing 1 generally sleeves the outer side of the stator 2 thermally, and the axial length thereof is generally greater than that of the stator 2. In the motor housing 1, a water channel, for example, in an axial or radial spiral type and a fold-back type is usually disposed according to the cooling requirement, and the water channel can use the prior art. A person skilled in the art can also design a water channel type with a better cooling effect according to the actual structure and size of the housing and according to the fluid dynamics and fluid-solid coupling principle.

Figure 4:
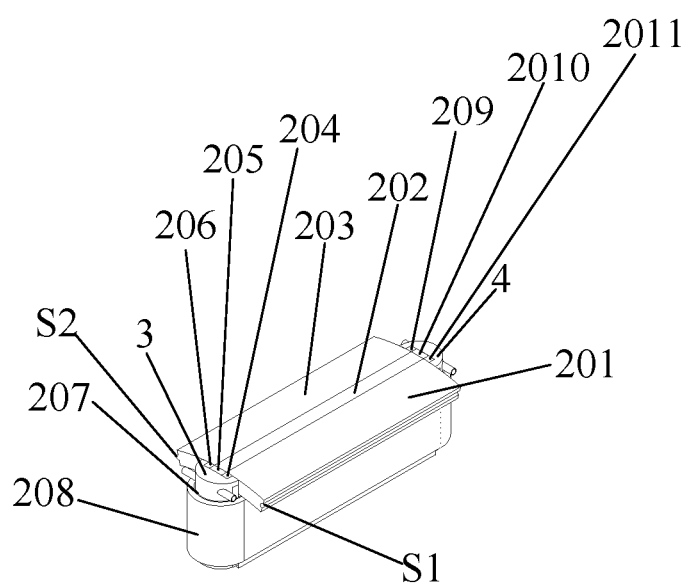
FIG. 4 is a structural view of a modular stator in Embodiment 1 of the present disclosure.
Figure 5:
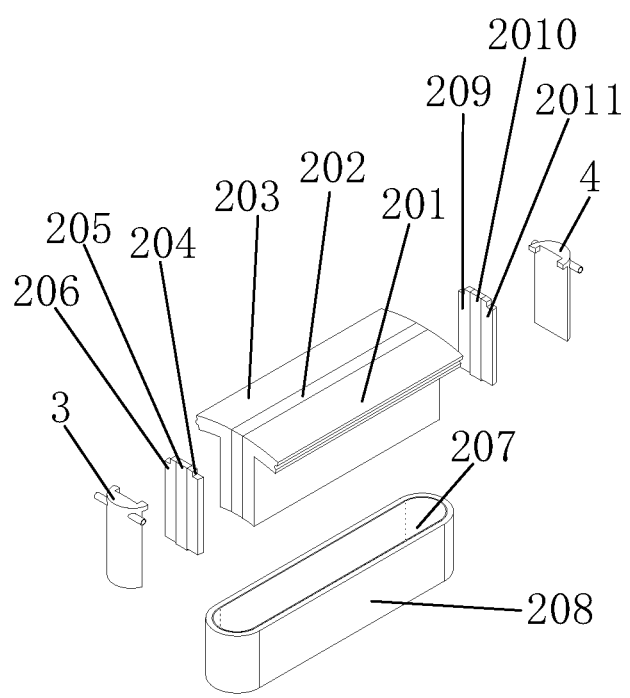
FIG. 5 is an exploded view of a modular stator structure in Embodiment 1 of the present disclosure.

The stator is of a modular structure, which is beneficial to processing and assembling of the stator, while ensuring a high stator slot full rate and reducing the length of an end of a winding. FIG. 4 and FIG. 5 are structural views of a modular stator in the present disclosure, and the modular stator includes a front side winding end heat dissipation module 3, a rear side winding end heat dissipation module 4, a modular stator left wing 201, a modular stator permanent magnet 202, a modular stator right wing 203, a front side magnetic conduction column left wing 204, an inter-front side magnetic conduction column permanent magnet 205, a front side magnetic conduction column right wing 206, insulating layers 207, a stator winding 208, a rear side magnetic conduction column right wing 209, an inter-rear side magnetic conduction column permanent magnet 2010, and a rear side magnetic conduction column left wing 2011.

As shown in FIG. 4 and FIG. 5, the modular stator permanent magnet 202 and the inter-front side magnetic conduction column permanent magnet 205, and the inter-rear side magnetic conduction column permanent magnet 2010 can be one piece of integrated permanent magnet, and the number of segments can also be properly set in the axial direction according to needs so as to facilitate processing and reduce the eddy current loss.

As shown in FIG. 4 and FIG. 5, the modular stator left wing 201 and the modular stator right wing 203 are in an "L" shape, and located on both sides of the modular stator permanent magnet 202, forming a stable "sandwich" structure, and facilitating the winding operation.

As shown in FIG. 4 and FIG. 5, the modular stator left wing 201 has a "groove" S1 on one side and the modular stator right wing 203 has a "protrusion" S2 on one side, and when all the modular stators form the complete stator 2 along the circumference, the "protrusion S2" is embedded into the "groove S1", which can improve the integrity and stability of the stator 2.

As shown in FIG. 4 and FIG. 5, the front side magnetic conduction column left wing 204, the inter-front side magnetic conduction column permanent magnet 205 and the front side magnetic conduction column right wing 206 form a radial magnetic conduction bridge in a front side magnetic pole bypass; and similarly, the rear side magnetic conduction column right wing 209, the inter-rear side magnetic conduction column permanent magnet 2010 and the rear side magnetic conduction column left wing 2011 form a radial magnetic conduction bridge in a rear side magnetic pole bypass.

The basic structure and functions to be achieved of the radial magnetic conduction bridge, the front side magnetic pole bypass and the rear side magnetic pole bypass are consistent with those of the magnetic conduction bridge and the magnetic pole bypass mentioned in the patents with the publication number of CN113323963A and the publication number of CN113285558A, i.e. the permanent magnet energy of the inter-front side magnetic conduction column permanent magnet and the inter-rear side magnetic conduction column permanent magnet is introduced into a magnetic levitation bearing to provide a bias magnetic field for a permanent magnet bias type magnetic levitation bearing. The applicant has described in detail a magnetic levitation bearing structure based on the magnetic pole bypass, a design method and a magnetic field adjusting method in the above-mentioned published patent, and also described the specific implementation process in the embodiment. The novelty and inventive step of the present disclosure lie in integrating the winding end heat dissipation module as a part of the stator structure of a magnetic levitation flux-switching motor, and the disclosed magnetic conduction bridge and magnetic pole bypass are only one component of the stator structure of a magnetic levitation flux-switching motor, and therefore the present disclosure will not describe the structures, such as a magnetic levitation bearing magnetic gathering shoe, a short-circuit wedge and a rotor, other than the magnetic pole bypass, while focusing on and describing the typical features and inventive structures of the present disclosure.

Referring to FIG. 4 and FIG. 5, as seen in the axial direction, one side of the radial magnetic conduction bridge in the front side magnetic pole bypass is in close contact with a T-shaped cross section of an axial front end of the "sandwich" structure, the other side of the radial magnetic conduction bridge in the front side magnetic pole bypass is embedded in the slot reserved in the front side winding end heat dissipation module 3, one side of the radial magnetic conduction bridge in the rear side magnetic pole bypass is in close contact with the T-shaped cross section of an axial rear end of the "sandwich" structure, and the other side of the radial magnetic conduction bridge in the rear side magnetic pole bypass is embedded in the slot reserved in the rear side winding end heat dissipation module 4.

As shown in FIG. 4 and FIG. 5, the stator winding 208 is a centralized winding, and since the structure of the modular stator is adopted, when the front side winding end heat dissipation module 3, the rear side winding end heat dissipation module 4, the modular stator left wing 201, the modular stator permanent magnet 202, the modular stator right wing 203, the front side magnetic conduction column left wing 204, the inter-front side magnetic conduction column permanent magnet 205, the front side magnetic conduction column right wing 206, the rear side magnetic conduction column right wing 209, the inter-rear side magnetic conduction column permanent magnet 2010 and the rear side magnetic conduction column left wing 2011 constitute a whole, the stator winding 208 may be closely wound on the modular stator one circle by one circle, and in order to ensure reliable insulation, the insulating layer 207 is disposed between the stator winding 208 and teeth of the modular stator.

A segment of the stator winding in the slot of the modular stator is usually a straight line, and front and rear ends are usually arcs; and with the affection by the minimum bending radius, there is a large gap between the front and rear ends of a conventional stator winding and an end surface of the modular stator, which results in that heat at the end of the stator winding is difficult to be transferred through a metal part of the modular stator, namely, the end of the winding is usually a hot spot area of the motor.

It can be seen from the basic principles of electromechanics and heat transfer that when the stator winding is closely wound on the modular stator, the equivalent length of the stator winding is smallest, namely, a resistance is smallest, which is beneficial to reduce the copper loss of the motor winding and reduce heat generation. At the same time, due to close winding, the gap between the stator winding and the modular stator is reduced, which is more beneficial for heat transfer. Thus, as shown in FIG. 4 and FIG. 5, the stator structure has the advantages of reducing the winding copper loss and improving the heat transfer efficiency.

Figure 6:
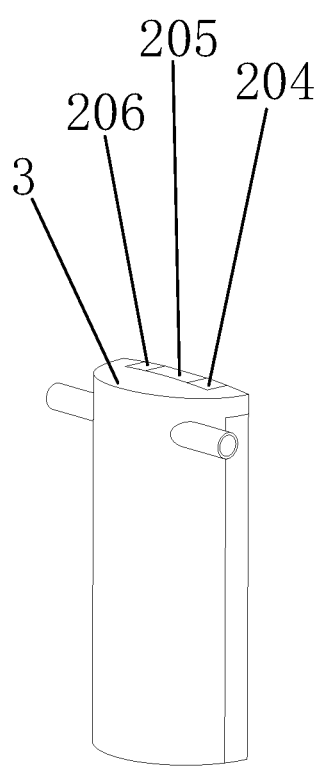
FIG. 6 is a structural view for a radial magnetic conduction bridge in a front side magnetic pole bypass embedded into a front side winding end heat dissipation module in Embodiment 1 of the present disclosure.
Figure 7:
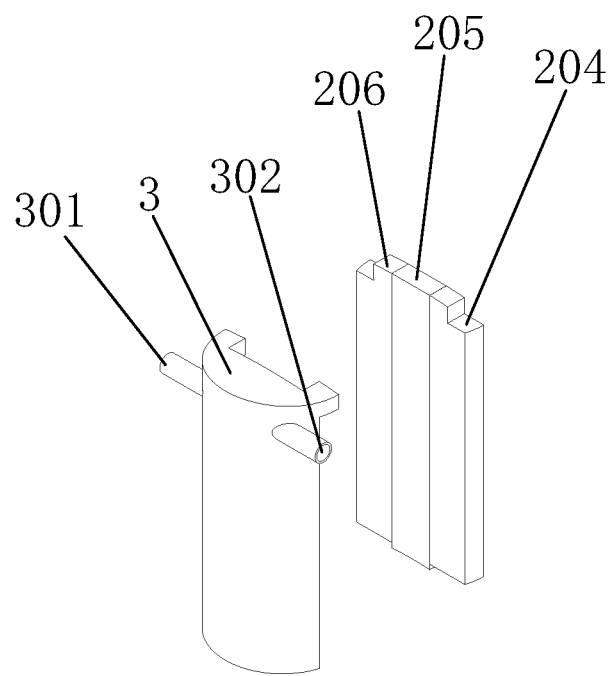
FIG. 7 is an expanded structural view of a radial magnetic conduction bridge in a front side magnetic pole bypass and a front side winding end heat dissipation module in Embodiment 1 of the present disclosure.
Figure 8:
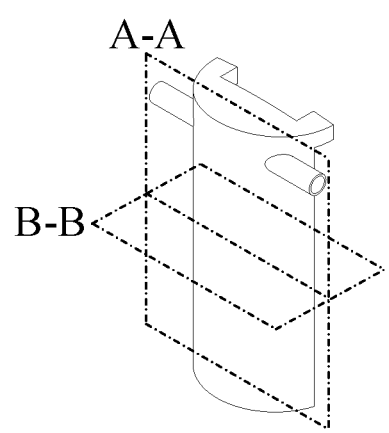
FIG. 8 is a structural view of a front side winding end heat dissipation module in Embodiment 1 of the present disclosure.

As shown in FIG. 6, FIG. 7 and FIG. 8, an axial rear side of the front side winding end heat dissipation module 3 has a slot for the radial magnetic conduction bridge to be embedded in, after being embedded in the slot, the radial magnetic conduction bridge of the front side magnetic pole bypass composed of the front side magnetic conduction column left wing 204, the inter-front side magnetic conduction column permanent magnet 205 and the front side magnetic conduction column right wing 206 is in close contact with the front side winding end heat dissipation module; an axial front side of the front side winding end heat dissipation module 3 is a smooth arc curved surface, and the diameter and arc length of the smooth arc curved surface can be optimally designed according to needs; preferably, a smooth arc curved surface line is an ellipse, the major axis of the ellipse is equal to the tooth width of the stator, and the minor axis is optimally designed according to needs; and the insulating layer 207 is disposed between the stator winding 208 and the smooth arc curved surface of the front side winding end heat dissipation module 3. Obviously, when the stator winding 208 is wound, it is easier to meet the requirement of the minimum bending radius of a wire, and at the same time, it is easier to achieve good thermal contact between the arc segment of the stator winding 208 and the smooth arc curved surface of the front side winding end heat dissipation module 3.

The rear side winding end heat dissipation module and the front side winding end heat dissipation module are consistent in structure. Although the introduction of the structure of the rear side winding end heat dissipation module and the front side winding end heat dissipation module makes it possible to increase the length of the stator winding, it is possible to eliminate the hot spot area at the end of the stator winding of the motor and thus still has an important application value.

Figure 9:
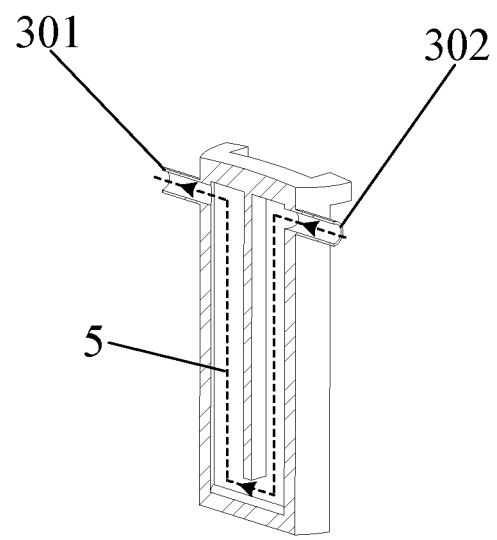
FIG. 9 is an A-A sectional view of a front side winding end heat dissipation module shown in FIG. 8 in the present disclosure.
Figure 10:
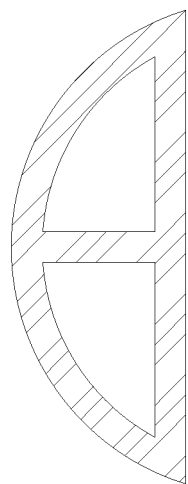
FIG. 10 is a B-B sectional view of a front side winding end heat dissipation module shown in FIG. 8.

Taking the front side winding end heat dissipation module as an example, FIG. 8, FIG. 9 and FIG. 10 are the front side winding end heat dissipation module 3 and a A-A cross-sectional view and a B-B cross-sectional view, and in conjunction with cross-sections A-A and B-B, it can be seen that the front side winding end heat dissipation module 3 is of a hollow structure, and is symmetrically provided with a front side winding end heat dissipation module cooling medium outlet 301 and a front side winding end heat dissipation module cooling medium inlet 302, a cooling medium flows in from the front side winding end heat dissipation module cooling medium inlet 302 at a certain speed or flow, the cooling medium flows out via the front side winding end heat dissipation module cooling medium outlet 301 through a hollow cavity, and a cooling medium flowing direction 5 in FIG. 9 displays a flowing trajectory of the cooling medium. The cooling medium may be water, ethylene glycol, cooling oil and the like.

For all the front side winding end heat dissipation modules, all the front side winding end heat dissipation module cooling medium outlets can be connected in parallel, and all the front side winding end heat dissipation module cooling medium inlets can be connected in parallel to form an integral cooling loop, so that the cooling medium circulates in the cavity in the front side winding end heat dissipation module. A cooling loop of the rear side winding end heat dissipation module is the same as the cooling loop of the front side winding end heat dissipation module, in fact, a circulation loop of the cooling medium is formed, and therefore heat generated at the two ends of the stator winding can be taken away by the cooling medium in time, so as to improve the heat dissipation capacity of the motor stator.

The cooling loops of the front side winding end heat dissipation module and the rear side winding end heat dissipation module can be separate cooling loops, and the two sets of cooling loops can also be connected in parallel or in series, or combined with a cooling loop in the motor housing to form a cooling system; and a person skilled in the art may design a suitable flow velocity and flow rate according to the actual structure, size and cooling requirement so as to achieve the best cooling effect.

Figure 11:
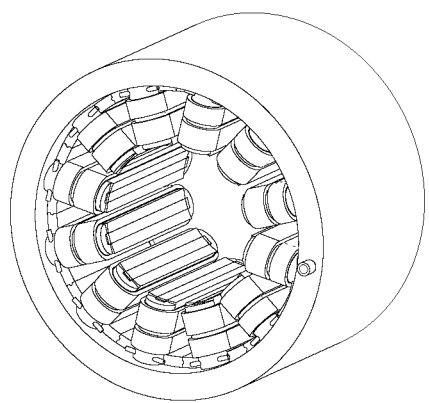
FIG. 11 is a structural view of a stator (including a motor housing) of a bearingless flux-switching motor provided by Embodiment 2 of the present disclosure.
Figure 12:
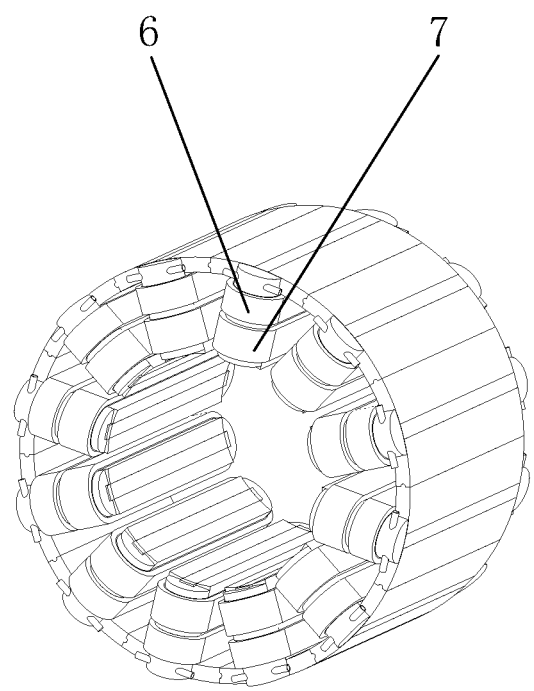
FIG. 12 is a structural view of a stator (with a motor housing hidden) of a bearingless flux-switching motor provided by Embodiment 2 of the present disclosure.
Figure 13:
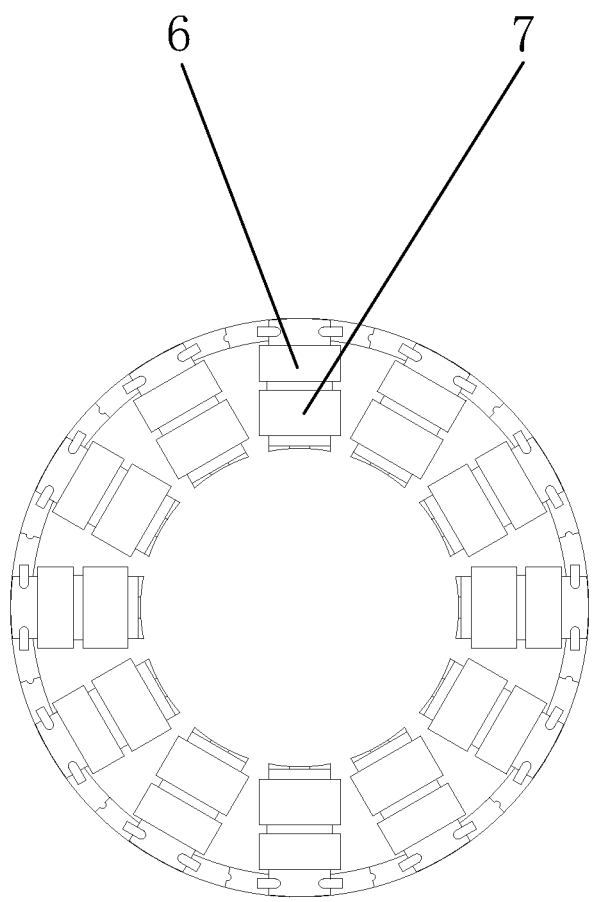
FIG. 13 is an axial front view of a stator structure (with a motor housing hidden) of a bearingless flux-switching motor provided by Embodiment 2 of the present disclosure.

Embodiment 2: A Stator Structure of a Magnetic Levitation Flux-Switching Motor Integrated with Winding End Heat Dissipation Modules and Two Sets of Windings As shown in FIG. 11, FIG. 12 and FIG. 13, for a stator structure of a bearingless flux-switching motor provided in this embodiment, a front side magnetic pole bypass and a rear side magnetic pole bypass in Embodiment 1 will not be disposed in the bearingless flux-switching motor, and therefore only the front side winding end heat dissipation module 3 and the rear side winding end heat dissipation module 4 will be disposed at two ends of a modular stator, while the stator winding 208 in Embodiment 1 is replaced with two sets of windings, namely a torque winding 6 and a levitation force winding 7.

The structure and cooling medium channel of the front side winding end heat dissipation module 3 and the rear side winding end heat dissipation module 4 in Embodiment 2 and Embodiment 1 are both kept consistent, the only difference lies in a difference of a volume and a size, and a person skilled in the art may properly optimize the volume and size according to the motor size.

Figure 14:
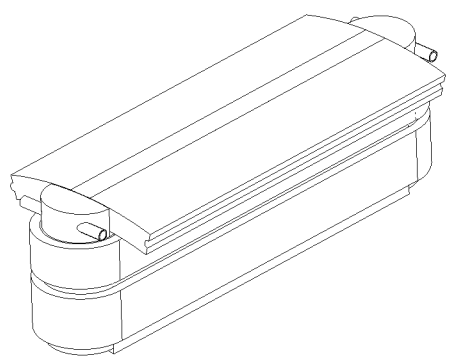
FIG. 14 is a structural view of a modular stator of a bearingless flux-switching motor provided by Embodiment 2 of the present disclosure.
Figure 15:
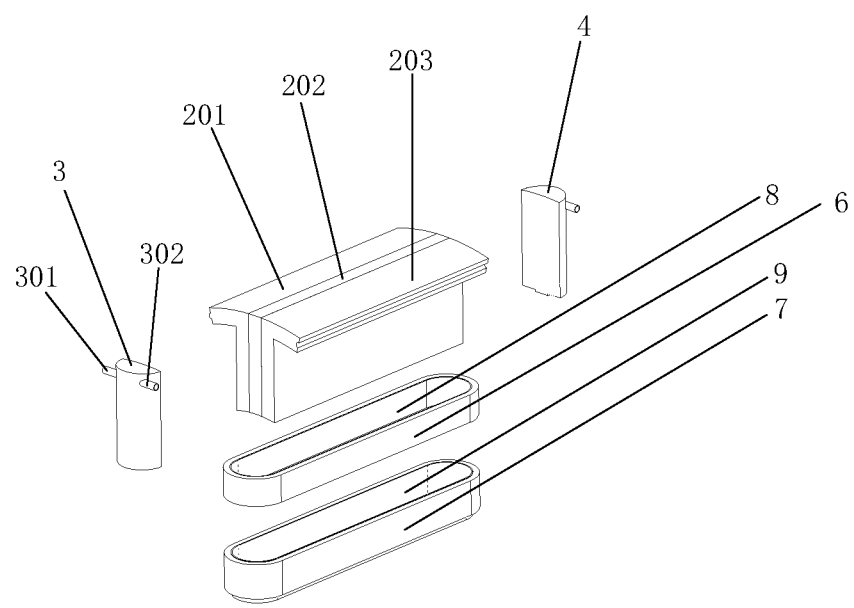
FIG. 15 is an exploded view of a modular stator structure of a bearingless flux-switching motor provided by Embodiment 2 of the present disclosure.

In FIG. 14 and FIG. 15, there are two sets of windings—the torque winding 6 and the levitation force winding 7, the torque winding 6 generates an electromagnetic torque when the bearingless flux-switching motor operates, and the levitation force winding generates a levitation force required when the bearingless flux-switching motor operates; and on the inner sides of the torque winding 6 and the levitation force winding 7, a torque winding insulation layer 8 and a levitation force winding insulation layer 9 are respectively disposed, and the torque winding insulation layer 8 and the levitation force winding insulation layer 9 can be of a separate structure or an integral structure of the insulating layer 207 in Embodiment 1.

It can be seen that, compared with Embodiment 1, since the front side magnetic pole bypass and the rear side magnetic pole bypass are eliminated in Embodiment 2, the end of the modular stator of the bearingless flux-switching motor will have a larger space to mount the front side winding end heat dissipation module and the rear side winding end heat dissipation module, and therefore the two winding end heat dissipation modules and the cooling medium circulating loop can be designed to be larger, which will significantly improve the heat dissipation capacity of the ends of the torque winding and the levitation force winding, and will also greatly help to improve the current density in the torque winding and the levitation force winding. Thus, implementation of the present disclosure will generate greater torque output capability and levitation force as compared to conventional bearingless flux-switching motors (e.g. Design and Analysis of a Novel Bearingless Flux-Switching Permanent Magnet Motor in the background).

The above description is only two embodiments of the present disclosure, in particular to a stator permanent magnet type flux-switching motor implemented in 12 modular stators. However, it is not intended to limit the present disclosure, and there are any modifications, equivalent replacements, improvements and the like within the spirit and principles of the present disclosure, such as replacing the stator permanent magnet type motor with a fractional slot concentrated winding rotor permanent magnet type motor; modifying the number of modular stator permanent magnets and modular stators in this embodiment to other reasonable values; or exchanging the outlet and inlet sequence of the front side winding end heat dissipation module cooling medium outlet and the front side winding end heat dissipation module cooling medium inlet; or modifying the built-in cooling channels of the front side winding end heat dissipation module and the rear side winding end heat dissipation module into other structures as long as the front side winding end heat dissipation module and the rear side winding end heat dissipation module with the built-in cooling channels are used and are co-located at the end of the stator winding with magnetic conduction columns, so as to achieve efficient heat dissipation at the end of the stator winding and achieve a higher integration degree; or in Embodiment II, part of the modular stators adopting the structure of the two sets of windings (the torque winding and the levitation force winding), and part of the modular stators adopting a single set of stator winding; or Embodiment II still retaining (or partially retaining) the front side magnetic pole bypass and the rear side magnetic pole bypass; or changing the left-right arrangement of the cooling medium inlet (or outlet) of the heat dissipation module into an up-down arrangement; or because of processing requirements, not adopting the structure of the modular stator, or partially adopting the structure of the modular stator, but still using the front side winding end heat dissipation module and the rear side winding end heat dissipation module; or because the tooth width of the stator and processing are limited, making the front side winding end heat dissipation module and the rear side winding end heat dissipation module into a solid structure, i.e. eliminating the built-in cooling channel thereof, but still remaining one side as the smooth arc curved surface, so as to transfer the heat at the end of the winding to the stator and the housing via the heat dissipation module, thereby improving the heat dissipation capacity, which should also be included in the scope of protection of the present disclosure.

In the description of the present disclosure, orientation or position relationships indicated by the terms such as "front", "rear", "left", "right", "one end", "the other end", "one side", "the other side" and the like are based on orientation or position relationships shown in the accompanying drawings, and are used only for more clear description of the present disclosure, rather than indicating or implying that the indicated apparatus or component needs to have a particular orientation, which should not be construed as limiting of the present disclosure.

A person skilled in the art can implement or use the present disclosure according to the foregoing descriptions of the disclosed embodiments. Various modifications to these embodiments are obvious to a person skilled in the art, and the general principles defined in this specification may be implemented in other embodiments without departing from the spirit and scope of the present disclosure. Therefore, the present disclosure is not limited to the embodiments shown in the specification, but conforms to the widest scope consistent with the principle and novel features that are disclosed in the specification.

What is claimed is:

1. A stator structure of a magnetic levitation flux-switching motor, comprising modular iron core structures each comprising a modular stator left wing, a modular stator permanent magnet and a modular stator right wing, wherein the stator structure further comprises: front side winding end heat dissipation modules and rear side winding end heat dissipation modules, an axial front side of the front side winding end heat dissipation module being a smooth arc curved surface in close contact with one end of a stator winding, an axial rear side of the front side winding end heat dissipation module being in close contact with an axial front side of the modular iron core structure, an axial front side of the rear side winding end heat dissipation module being in close contact with an axial rear side of the modular iron core structure, and an axial rear side of the rear side winding end heat dissipation module being a smooth arc curved surface in close contact with the other end of the stator winding, wherein when the stator structure further comprises a radial magnetic conduction bridge of a front side magnetic pole bypass and a radial magnetic conduction bridge of a rear side magnetic pole bypass, a slot for the radial magnetic conduction bridge of the front side magnetic pole bypass to be embedded in is reserved in the axial rear side of the front side winding end heat dissipation module, the radial magnetic conduction bridge of the front side magnetic pole bypass is in close contact with the modular iron core structure after being embedded in the front side winding end heat dissipation module, a slot for the radial magnetic conduction bridge of the rear side magnetic pole bypass to be embedded in is reserved in the axial front side of the rear side winding end heat dissipation module, and the radial magnetic conduction bridge of the rear side magnetic pole bypass is in close contact with the modular iron core structure after being embedded in the rear side winding end heat dissipation module.

2. The stator structure of a magnetic levitation flux-switching motor according to claim 1, wherein the smooth arc curved surface is an elliptical curve, and the major axis of the elliptical curve is equal to the tooth width of the stator structure.

3. The stator structure of a magnetic levitation flux-switching motor according to claim 1, wherein an insulating layer is disposed between the smooth arc curved surface of the front side winding end heat dissipation module and the stator winding, and an insulating layer is disposed between the smooth arc curved surface of the rear side winding end heat dissipation module and the stator winding.

4. The stator structure of a magnetic levitation flux-switching motor according to claim 1, wherein the front side winding end heat dissipation module and the rear side winding end heat dissipation module are both of hollow structures having cooling medium channels and are both provided with a cooling medium inlet and a cooling medium outlet.

5. The stator structure of a magnetic levitation flux-switching motor according to claim 4, wherein the modular stator left wing of the stator structure is provided with a groove for splicing other stator structures in the circumferential direction, and the modular stator right wing of the stator structure is integrally formed with a protrusion for splicing other stator structures in the circumferential direction.

* * * * *